(12) United States Patent
Hayden et al.

(10) Patent No.: US 7,901,835 B2
(45) Date of Patent: Mar. 8, 2011

(54) PLATINUM ALLOY CATALYST

(75) Inventors: Brian Elliott Hayden, Southampton (GB); Christopher Edward Lee, Southampton (GB); Claire Mormiche, Southampton (GB); David Thompsett, Reading (GB)

(73) Assignee: Johnson Matthey Public Limited Company, London (GB)

( * ) Notice: Subject to any disclaimer, the term of this patent is extended or adjusted under 35 U.S.C. 154(b) by 649 days.

(21) Appl. No.: 11/661,333

(22) PCT Filed: Jul. 27, 2005

(86) PCT No.: PCT/GB2005/002957
§ 371 (c)(1),
(2), (4) Date: Dec. 4, 2007

(87) PCT Pub. No.: WO2006/021740
PCT Pub. Date: Mar. 2, 2006

(65) Prior Publication Data
US 2008/0199762 A1    Aug. 21, 2008

(30) Foreign Application Priority Data
Aug. 27, 2004  (GB) ................... 0419062.5

(51) Int. Cl.
*H01M 8/10* (2006.01)
*H01M 4/02* (2006.01)
*H01M 4/36* (2006.01)
*H01M 4/62* (2006.01)
*H01M 4/92* (2006.01)
*B01J 23/00* (2006.01)
*B01J 21/00* (2006.01)
*B01J 20/00* (2006.01)
*C22C 5/02* (2006.01)

(52) U.S. Cl. ......... 429/524; 429/485; 429/487; 429/532; 502/330; 502/331; 502/344; 502/345; 420/510

(58) Field of Classification Search .................. 502/184, 502/185, 330, 333, 334, 339, 344; 420/510; 429/44, 218.1, 221, 224, 231.4, 231.5, 231.8
See application file for complete search history.

(56) References Cited

U.S. PATENT DOCUMENTS

| 5,759,944 | A | 6/1998 | Buchanan et al. | |
| 6,869,712 | B2 * | 3/2005 | Mittelstadt et al. | 429/479 |
| 6,995,114 | B2 * | 2/2006 | Gorer | 502/325 |

(Continued)

FOREIGN PATENT DOCUMENTS

EP    0 450 849 A2    10/1991

(Continued)

OTHER PUBLICATIONS

Samuel Guerin et al., "Combinatorial Electrochemical Screening of Fuel Cell Electrocatalysts," *J. Comb. Chem.*, 6 (1), 149-158, 2004.

*Primary Examiner* — Cam N Nguyen
(74) *Attorney, Agent, or Firm* — RatnerPrestia

(57) ABSTRACT

A platinum alloy catalyst can be used as a fuel cell catalyst. The platinum alloy is a PtAuX alloy wherein X is one or more metals chosen from the group consisting of transition metals, and wherein the alloy contains 40-97% Pt, 1-40% Au and 2-20% X. Electrodes, catalysed membranes and membrane electrode assemblies comprising the catalyst are also disclosed.

33 Claims, 2 Drawing Sheets

U.S. PATENT DOCUMENTS

| | | | |
|---|---|---|---|
| 7,037,873 B2 * | 5/2006 | Kato | 502/180 |
| 7,125,822 B2 * | 10/2006 | Nakano et al. | 502/339 |
| 7,208,439 B2 * | 4/2007 | Zhong et al. | 502/185 |
| 7,235,324 B2 * | 6/2007 | Sugimasa et al. | 429/524 |
| 7,479,343 B2 * | 1/2009 | Devenney et al. | 429/523 |
| 7,510,993 B2 * | 3/2009 | Levey et al. | 502/150 |
| 7,566,514 B2 * | 7/2009 | Lee et al. | 429/483 |
| 2003/0045425 A1 * | 3/2003 | Ruth et al. | 502/325 |
| 2004/0067847 A1 * | 4/2004 | Kato | 502/325 |
| 2005/0070427 A1 * | 3/2005 | Pak | 502/182 |
| 2006/0094597 A1 * | 5/2006 | Goia et al. | 502/326 |
| 2006/0178260 A1 * | 8/2006 | Zhong et al. | 502/185 |

FOREIGN PATENT DOCUMENTS

| | | |
|---|---|---|
| EP | 0 557 674 A1 | 9/1993 |
| EP | 0 731 520 A1 | 9/1996 |
| EP | 0 791 974 A1 | 8/1997 |
| GB | 1047933 | 11/1966 |
| WO | WO-94/24710 A1 | 10/1994 |

\* cited by examiner

PLATINUM ALLOY CATALYST

This application is the U.S. National Phase application of PCT International Application No. PCT/GB2005/002957, filed Jul. 27, 2005, and claims priority of British Patent Application No. 0419062.5, filed Aug. 27, 2004.

FIELD OF THE INVENTION

The present invention relates to a catalyst comprising a platinum alloy. The invention further relates to fuel cell components comprising the catalyst.

BACKGROUND OF THE INVENTION

A fuel cell is an electrochemical cell comprising two electrodes separated by an electrolyte. A fuel, e.g. hydrogen or methanol, is supplied to the anode and an oxidant, e.g. oxygen or air, is supplied to the cathode. Electrochemical reactions occur at the electrodes, and the chemical energy of the fuel and the oxidant is converted to electrical energy and heat. Electrocatalysts are used to promote the electrochemical oxidation of the fuel at the anode and the electrochemical reduction of oxygen at the cathode.

Electrocatalysts for oxygen reduction typically comprise platinum or platinum alloyed with one or more base metals. The platinum alloy can be used as a high surface area metal black (an unsupported catalyst) or can be deposited onto a conductive carbon substrate (a supported catalyst). EP 450 849 discloses binary and ternary platinum alloy catalysts and their use in fuel cells. EP 557 674 discloses fuel cell alloy catalysts comprising platinum, gold, and two or more metals chosen from nickel, cobalt and manganese. The amount of nickel, cobalt and/or manganese in the catalysts of EP 557 674 is preferably 23 atomic percent of each metal (if two of the metals are present) or 19 atomic percent of the first and second metals and 8 atomic percent of the third metal (if three of the metals are present).

Platinum is an expensive metal, so it is desirable to increase the proportion of lower cost metals in the platinum alloy whilst maintaining or improving catalytic activity. The present inventors have sought to provide improved platinum alloy catalysts that have higher activity than known catalysts or that have similar activity but lower platinum content.

SUMMARY OF THE INVENTION

Accordingly, the present invention provides a catalyst comprising a PtAuX alloy wherein X is one or more metals chosen from the group consisting of transition metals, and wherein the alloy contains 40-97% Pt, 1-40% Au and 2-20% X.

The inventors have found that alloys of Pt, Au and X wherein the amounts of the metals are within the stated ranges have surprisingly high activity for the electrochemical reduction of oxygen. The % values for the PtAuX alloy are atomic percentages (i.e. they are based on the amounts of Pt, Au and X atoms). The PtAuX alloy contains only Pt, Au and X and does not contain any other metals. By the term "alloy" we mean that there is at least some intimate mixing between the Pt, Au and X metals, but the intimate mixing is not necessarily uniform throughout the whole alloy particle.

DETAILED DESCRIPTION

Figure 1:
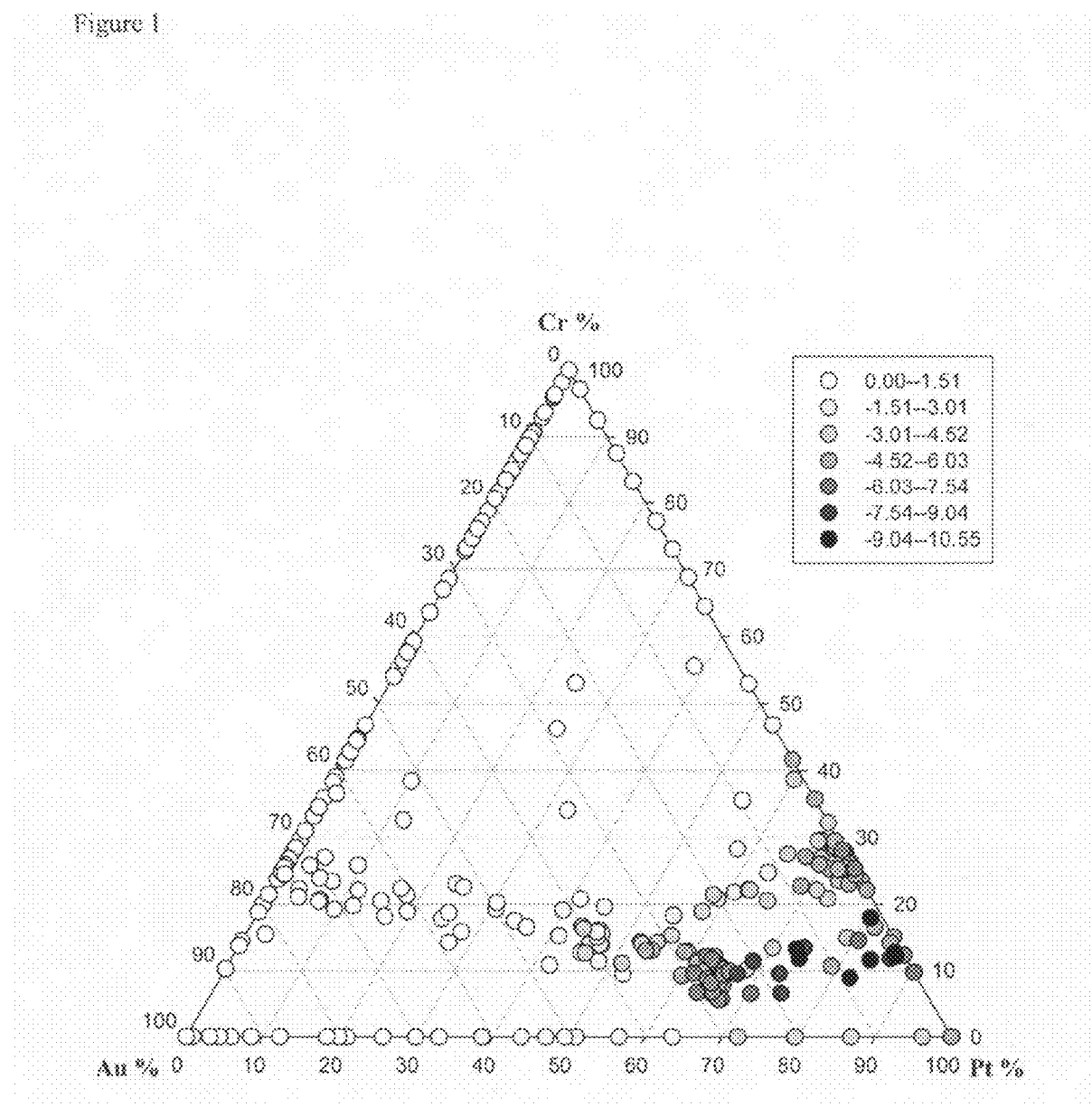
FIG. 1 is a ternary diagram showing the activity of the different catalysts compared to the amounts of Pt, Au and Cr in the catalysts.

X is one or more metals chosen from the transition metals, is suitably one or more metals chosen from the first row transition metals, is preferably one or more metals chosen from Cr, Ti and Cu, and is most preferably one or more metals chosen from Cr and Ti. In a preferred embodiment, X is only one metal chosen from the transition metals, is suitably one metal chosen from the first row transition metals and is preferably only one metal chosen from Cr, Ti and Cu. Ternary PtAuX alloys are preferred compared to alloys containing four or five metals because the alloys are easier to prepare.

The amount of Pt in the PtAuX alloy is 40-97%, preferably 40-90%, most preferably 50-80%. The amount of Au in the PtAuX alloy is 1-40%, preferably 5-40%, most preferably 9-40%. If X is two or more of Co, Ni and Mn, the amount of Au is preferably not 8%. In a particular embodiment, the amount of Au is preferably 5-40% but excluding 8%. The amount of X in the PtAuX alloy is 2-20%, preferably 5-17% and most preferably about 10-15%. If X is two of Co, Ni and Mn, the amount of X is preferably not 8%. If X is Co, Ni and Mn, the amount of X is preferably not 12%. In a particular embodiment, the amount of X is 2-20% but excluding 8% and 12%, preferably 5-17% but excluding 8% and 12%. The preferred amount of the metals in the PtAuX alloy balances considerations of cost (favouring less Pt and more Au and X) and catalytic activity (favouring more Pt, less Au and about 10-15% X). The amount of X that provides the most active catalysts is considerably lower than the amounts of X in the catalysts disclosed in the examples of EP 557 674.

The catalyst of the invention can be used in a fuel cell as an unsupported catalyst (i.e. as a metal black) or as a supported catalyst (i.e. dispersed on a support material). In a supported catalyst according to the present invention the PtAuX alloy is suitably dispersed on a conductive carbon material. The catalyst of the invention preferably consists essentially of the PtAuX alloy dispersed on a conductive carbon material. Suitable carbon support materials include furnace carbon blacks or acetylene blacks. Suitably the amount of the PtAuX alloy is 5-80 wt % based on the total weight of the supported catalyst, preferably 10-60 wt %.

Catalysts according to the invention can be manufactured using known techniques. The inventors have manufactured unsupported catalysts using vapour deposition techniques. To prepare supported catalysts, techniques such as those disclosed in EP 450 849 wherein carbon particles are slurried in an aqueous solution of metal salts, are appropriate.

In a further aspect the present invention provides an electrode comprising a catalyst according to the invention deposited on an electronically conducting substrate. The catalyst can be deposited onto a substrate using well known techniques, such as those disclosed in EP 731 520. The catalyst may be formulated into an ink, comprising an aqueous and/or organic solvent, optional polymeric binders and optional proton-conducting polymer. The ink may be deposited onto an electronically conducting substrate using techniques such as spraying, printing and doctor blade methods. Suitable substrates include carbon fibre papers and filled carbon fibre non-woven webs, such as those disclosed in EP 791 974. Electrodes according to the invention are suitably used as the cathodes of fuel cells. The fuel cells may be acid electrolyte fuel cells such as PEM fuel cells or phosphoric acid fuel cells, or they may be alkaline electrolyte fuel cells.

In polymer electrolyte membrane (PEM) fuel cells, the electrolyte is a polymer electrolyte membrane. Electrocatalysts may be deposited onto one or both faces of the polymer electrolyte membrane to form a catalysed membrane. In a further aspect the present invention provides a catalysed membrane comprising a catalyst according to the invention deposited on a polymer electrolyte membrane. The catalyst can be deposited onto the membrane using well known techniques. The catalyst may be formulated into an ink and either directly deposited onto the membrane or deposited onto a decal blank for subsequent transfer to a membrane. Suitable membranes are well known to those skilled in the art and include perfluorinated sulphonic acid membranes such as Nafion®, Flemion® and Aciplex®.

In PEM fuel cells, the polymer electrolyte membrane is interposed between two catalyst layers, and each catalyst layer is in contact with an electronically conducting substrate. This five-layer assembly is known as a membrane electrode assembly. In a yet further aspect the present invention provides a membrane electrode assembly comprising a catalyst according to the invention. The membrane electrode assembly may be prepared by a process wherein an electrode according to the invention is combined with a polymer electrolyte membrane. Alternatively, the membrane electrode assembly may be prepared by a process wherein a catalysed membrane according to the invention is combined with an electronically conducting substrate. In the membrane electrode assembly according to the invention, the PtAuX catalyst is suitably located in the cathode of the membrane electrode assembly.

EXAMPLES

The invention will now be described by reference to Examples that are illustrative and not limiting of the invention:

Catalyst Preparation

A high throughput physical deposition method (HT-PVD) was used to synthesise PtAuX alloys as thin film materials on micro-fabricated electrode arrays (this type of array is described in Guerin et al, J. Combinatorial Chemistry, 6 (2004) 149). Simultaneous deposition of the components at a substrate temperature of 300K prevented segregation and bulk phase formation.

Catalyst Testing

The compositions of the alloys were obtained by energy dispersive X-ray spectrometry (EDS), and the activity of the alloys to reduce oxygen in $HClO_4$ electrolyte was measured using a fast high throughput electrochemical methodology. Measurements were made in $O_2$ saturated solutions in the potential range $0.7$-$0.9V_{SHE}$ at 300K.

Example 1

PtAuCr Catalysts

A catalyst array was prepared using Pt, Au and Cr. The amount of the Pt ranged from 0-100%, the amount of Au ranged from 0-100% and the amount of Cr ranged from 0-100%. FIG. 1 is a ternary diagram showing the activity of the different catalysts compared to the amounts of Pt, Au and Cr in the catalysts. It is clear from the figure that catalysts in a bottom right hand section of the plot have the best activity. The chromium content in the most active catalysts is in a reasonably narrow range centred around 10%, whereas the platinum content varies from around 90% down to 50% or 40% and the gold content varies from around 2% up to about 40%.

Example 2

PtAuTi Catalysts

Figure 2:
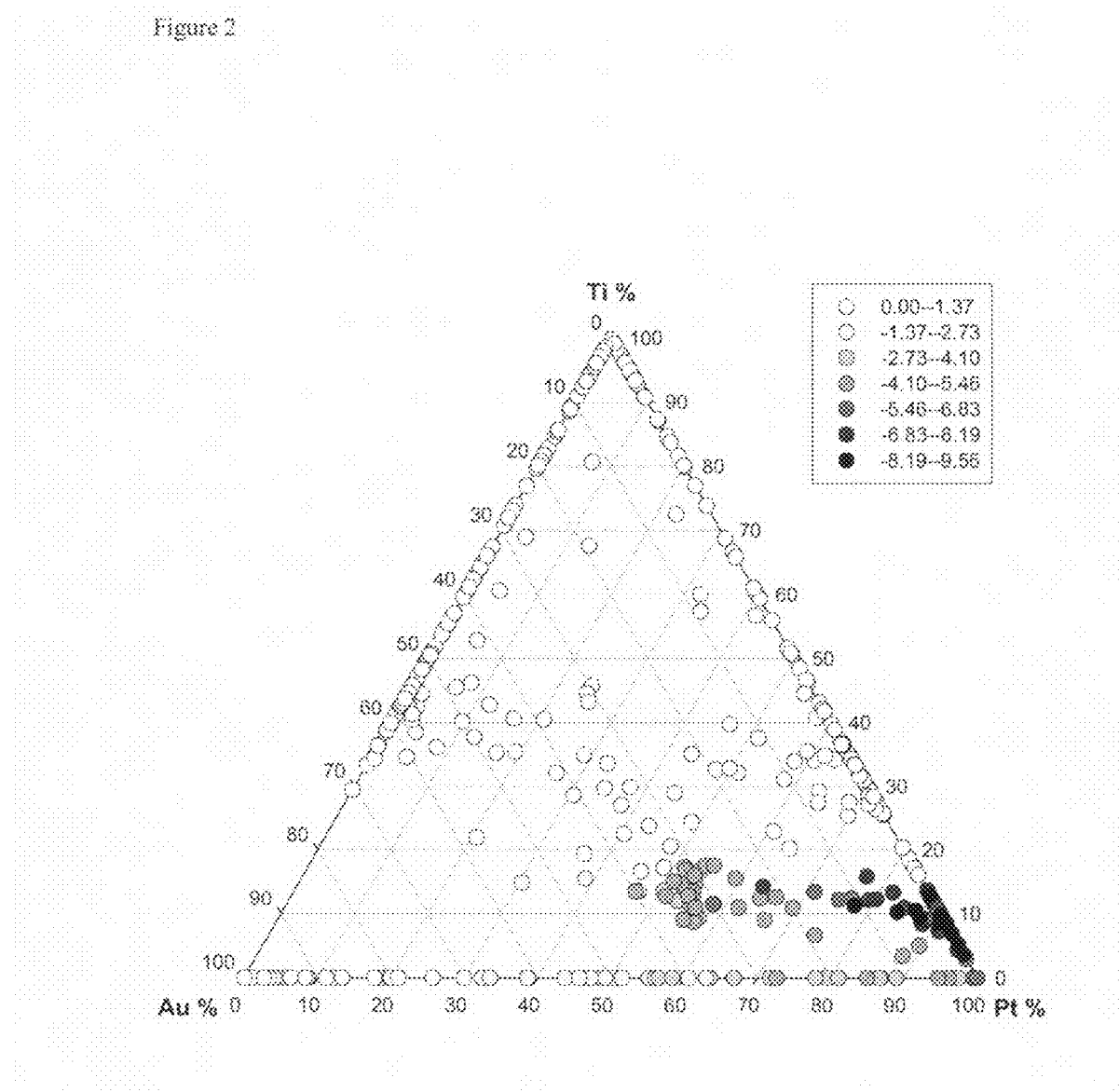
FIG. 2 is a ternary diagram showing the activity of the different catalysts compared to the amounts of Pt, Au and Ti in the catalysts.

A catalyst array was prepared using Pt, Au and Ti. The amount of the Pt ranged from 0-100%, the amount of Au ranged from 0-100% and the amount of Cr ranged from 0-100%. FIG. 2 is a ternary diagram showing the activity of the different catalysts compared to the amounts of Pt, Au and Ti in the catalysts. It is clear from the figure that catalysts in a bottom right hand section of the plot have the best activity. The titanium content in the most active catalysts is in a reasonably narrow range centred around 10%, whereas the platinum content varies from around 90% down to 50%, and the gold content varies from around 2% up to about 50%.

The invention claimed is:

1. A catalyst comprising a PtAuX alloy wherein X is one or more metals selected from the group consisting of transition metals, and wherein the alloy contains 40-97% Pt, 1-40% Au and 2-20% X.

2. A catalyst according to claim 1, wherein X is one or more metals selected from the first row transition metals.

3. A catalyst according to claim 2, wherein X is one or more metals selected from Cr, Ti and Cu.

4. A catalyst according to claim 3, wherein X is one or more metals selected from Cr and Ti.

5. A catalyst according to claim 1, wherein the amount of Pt in the PtAuX alloy is 40-90%.

6. A catalyst according to claim 5, wherein the amount of Pt in the PtAuX alloy is 50-80%.

7. A catalyst according to claim 1, wherein the amount of Au in the PtAuX alloy is 5-40%.

8. A catalyst according to claim 7, wherein the amount of Au in the PtAuX catalyst is 5-40%, excluding 8%.

9. A catalyst according to claim 7, wherein the amount of Au in the PtAuX alloy is 9-40%.

10. A catalyst according to claim 1, wherein the amount of X in the PtAuX alloy is 5-17%.

11. A catalyst according to claim 10, wherein the amount of X in the PtAuX alloy is about 10-15%.

12. A catalyst according to claim 1, wherein the PtAuX alloy is dispersed on a conductive carbon material.

13. An electrode comprising a catalyst according to claim 1 deposited on an electronically conducting substrate.

14. A catalysed membrane comprising a catalyst according to claim 1 deposited on a polymer electrolyte membrane.

15. A membrane electrode assembly comprising a catalyst according to claim 1.

16. A membrane electrode assembly according to claim 15, wherein the catalyst is incorporated in the cathode.

17. A catalyst comprising a PtAuX alloy wherein X is one or more metals selected from the group consisting of transition metals, and wherein the alloy contains 40-97% Pt, 1-40% Au and 2-20% X, but does not contain 8% X or 12% X.

18. A catalyst according to claim 17, wherein X is one or more metals selected from the first row transition metals.

19. A catalyst according to claim 18, wherein X is one or more metals selected from Cr, Ti and Cu.

20. A catalyst according to claim 19, wherein X is one or more metals selected from Cr and Ti.

21. A catalyst according to claim 17, wherein the amount of Pt in the PtAuX alloy is 40-90%.

22. A catalyst according to claim 21, wherein the amount of Pt in the PtAuX alloy is 50-80%.

23. A catalyst according to claim 17, wherein the amount of Au in the PtAuX alloy is 5-40%.

24. A catalyst according to claim 23, wherein the amount of Au in the PtAuX catalyst is 5-40%, excluding 8%.

25. A catalyst according to claim 24, wherein the amount of Au in the PtAuX alloy is 9-40%.

26. A catalyst according to claim 17, wherein the amount of X in the PtAuX alloy is 5-17%.

27. A catalyst according to claim 26, wherein the amount of X in the PtAuX alloy is about 10-15%.

28. A catalyst according to claim 17, wherein the PtAuX alloy is dispersed on a conductive carbon material.

29. An electrode comprising a catalyst according to claim 17 deposited on an electronically conducting substrate.

30. A catalysed membrane comprising a catalyst according to claim 17 deposited on a polymer electrolyte membrane.

31. A membrane electrode assembly comprising a catalyst according to claim 17.

32. A catalyst comprising a ternary PtAuX alloy wherein the alloy consists of Pt, Au, and X, and X is one or more metals selected from the group consisting of transition metals, and wherein the alloy contains 40-97% Pt, 1-40% Au, and 2-20% X.

33. A catalyst consisting essentially of a PtAuX alloy dispersed on a conductive carbon material, wherein X is one or more metals selected from the group consisting of transition metals, and wherein the alloy contains 40-97% Pt, 1-40% Au, and 2-20% X.

* * * * *